United States Patent [19]
Lowe

[11] Patent Number: 6,077,002
[45] Date of Patent: Jun. 20, 2000

[54] STEP MILLING PROCESS

[75] Inventor: Donald D. Lowe, Bow, N.H.

[73] Assignee: General Electric Company, Cincinnati, Ohio

[21] Appl. No.: 09/166,248

[22] Filed: Oct. 5, 1998

[51] Int. Cl.[7] .................................................. B23C 3/18
[52] U.S. Cl. ..................... 409/132; 29/889.2; 416/223 A
[58] Field of Search .............. 409/51, 131, 132, 409/177, 198, 199; 407/34, 54; 29/889.7, 889.6, 889.2; 416/223 A

[56] References Cited

U.S. PATENT DOCUMENTS

| | | |
|---|---|---|
| 1,744,757 | 1/1930 | Ferguson . |
| 2,390,994 | 12/1945 | Vlieg . |
| 2,429,324 | 10/1947 | Meisser . |
| 2,431,604 | 11/1947 | Birmann . |
| 2,480,807 | 8/1949 | Vlieg . |
| 2,633,776 | 4/1953 | Schenk . |
| 2,703,511 | 3/1955 | Griner ...................................... 409/198 |
| 2,962,941 | 12/1960 | Stein et al. . |
| 3,130,481 | 4/1964 | Ahlen . |
| 3,370,508 | 2/1968 | Iaia ......................................... 409/132 |
| 4,046,057 | 9/1977 | Imamura . |
| 4,260,304 | 4/1981 | Jacobi ..................................... 409/132 |
| 5,782,589 | 7/1998 | Cole ......................................... 407/54 |

Primary Examiner—Daniel W. Howell
Attorney, Agent, or Firm—Andrew C. Hess; Gerry S. Gressel

[57] ABSTRACT

A blank is milled using a rotating mill. A groove having a bottom is first cut across the blank to partially expose a sidewall in the blank. The sidewall is then cut by the mill. By alternately repeating cutting of the groove and sidewall, the groove is milled deeper in the blank to form a pocket along which the sidewall extends. Since the sidewall is formed in steps, improved efficiency and accuracy is obtained therefor.

10 Claims, 3 Drawing Sheets

STEP MILLING PROCESS

BACKGROUND OF THE INVENTION

The present invention relates generally to gas turbine engines, and, more specifically, to milling of blisks therein.

A turbofan gas turbine engine includes in serial flow communication a fan through which ambient air is propelled, a multistage compressor for pressurizing a portion of the air, a combustor wherein the compressed air is mixed with fuel and ignited for generating hot combustion gases, and high and lower pressure turbines which extract energy from the combustion gases for powering the compressor and fan, respectively. Both the fan and compressor include airfoils in the form of rotor blades which extend radially outwardly from a rotor disk. The blades are freestanding or cantilevered radially outwardly from the disk and the centrifugal loads generated therein during operation must be carried by the disk within acceptable stress limits.

A typical rotor blade is carried in the disk by an integral dovetail which slides into a corresponding dovetail slot in the perimeter of the disk. However, as the number of rotor blades around the perimeter of the disk increases in some designs, insufficient material is available around the perimeter of the disk for supporting the several blades within the acceptable stress limits.

Accordingly, blisks have been developed and are found in commercial use and are characterized by the absence of independent dovetails, with the blades instead being integrally joined to the rotor disk in a one-piece, unitary assembly. In this way, fan or compressor blisks may be used in an engine for maximizing aerodynamic efficiency thereof while reducing the associated centrifugal stresses in the supporting disk.

However, the manufacture of a blisk is substantially more complex than the manufacture of individual rotor blades and discrete rotor disks, and manufacturing defects therein involve a substantially greater risk. If even one of the several rotor blades being manufactured is outside an acceptable manufacturing tolerance, the entire blisk is defective and must be scrapped at considerable expense. Accordingly, the manufacture of a single blisk requires great care and attention to manufacturing tolerances which increases the time to manufacture the blisk, and correspondingly increases the cost thereof.

For example, one conventional method of manufacturing a blisk includes a multistep point machining or milling individual blades therein in turn. Since the individual blades have airfoils specifically configured for their fan or compressor functions, the blades typically twist about a radial axis from their roots to tips, have varying taper, and have generally concave pressure sides with correspondingly opposite generally convex suction sides. The complex three-dimensional shape of the individual blades is precisely point milled with a suitable cutter or cutting tool in the form of a ball end mill. This mill includes a semispherical cutting end attached to a cylindrical shaft which rotates the mill for removing material in grooves from the blank in multiple passes.

The point milling process typically includes a first step of rough milling individual pockets axially across the perimeter of the blank between its opposite axial faces in successive steps or levels until the pocket has a substantially complete depth. The blank is indexed to repeat the rough milling of the several pockets around the perimeter of the blank with the remaining material between the blanks being freestanding, radially outwardly extending cantilevers which roughly approximate the 3-D shape of the individual airfoils with a suitable excess of material therearound. This rough milling uses a relatively large ball end mill which is plunged into the blank in each pass over substantially its full radius to maximize material removal.

A second step in the process uses a smaller ball end mill to semi-finish the platform at the bottom of each pocket and provide suitably small radii with the freestanding rough airfoils.

A third step uses yet another ball end mill of the initially large diameter to semi-finish the pressure and suction sides of the individual rough airfoils in turn. The end mill typically circles each rough airfoil in multiple cutting steps from the outer tip to the inner root near the platform, and uses suitably smaller tolerances to produce a semi-finish airfoil still having excess material.

A fourth step uses yet another, small ball end mill to finish machine the individual platforms at the bottom of the pockets to final dimensions with suitably small tolerances.

And, the last step in machining the airfoil blades uses yet another large ball end mill to finish machine the individual airfoils in turn by again circling the individual airfoils from tip to root in multiple steps or passes with suitably small tolerances to achieve the precise dimensions of the required airfoils.

In another conventional manufacturing process, the individual airfoils may be rough and semi-finish milled as in the above process, with the final machining thereof being effected using electrochemical machining (ECM). ECM machining is precise and relatively quick, yet requires expensive equipment which correspondingly increases the cost of manufacture.

In both methods, however, the individual rough airfoils must nevertheless be semi-finish milled with a ball end mill which necessarily applies a contact force on the airfoils. Since the airfoils are freestanding or radially cantilevered, they inherently elastically deflect under the force of the cutting mill, which must be accommodated in the milling process to avoid removing excessive material which would render the blisk defective. Airfoil flexibility is accommodated by removing relatively little material in each pass to minimize the elastic deflection of the airfoils, at a considerable increase in milling time. Since ball end milling cuts a series of grooves along the surface of the airfoil it leaves intervening cusps which must be minimized in height for achieving an acceptably smooth final surface contour of the pressure and suction sides of the individual airfoils.

Furthermore, the individual blisk airfoils are individually milled and therefore additional manufacturing variations occur statistically from blade-to-blade. Since the resulting blisk is a rotor component which operates at substantial rotary speed, it must be suitably dynamically balanced during operation. Balancing is typically effected by providing an annular balancing land near the hub of the disk from which material may be precisely machined for balancing the entire blisk.

However, the balance correction effected at the land necessarily has a limit which sometimes may be insufficient in the event of excess variation in final dimensions of the several blisk airfoils. In order to balance such a blisk, individual airfoils may require additional milling provided sufficient material remains thereon in order to reduce the initial unbalanced condition of the blisk.

Accordingly, it is desired to provide an improved process for milling gas turbine engine blisks with improved efficiency and accuracy.

BRIEF SUMMARY OF THE INVENTION

A blank is milled using a rotating mill. A groove having a bottom is first cut across the blank to partially expose a sidewall in the blank. The sidewall is then cut by the mill. By alternately repeating cutting of the groove and sidewall, the groove is milled deeper in the blank to form a pocket along which the sidewall extends. Since the sidewall is formed in steps, improved efficiency and accuracy is obtained therefor.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
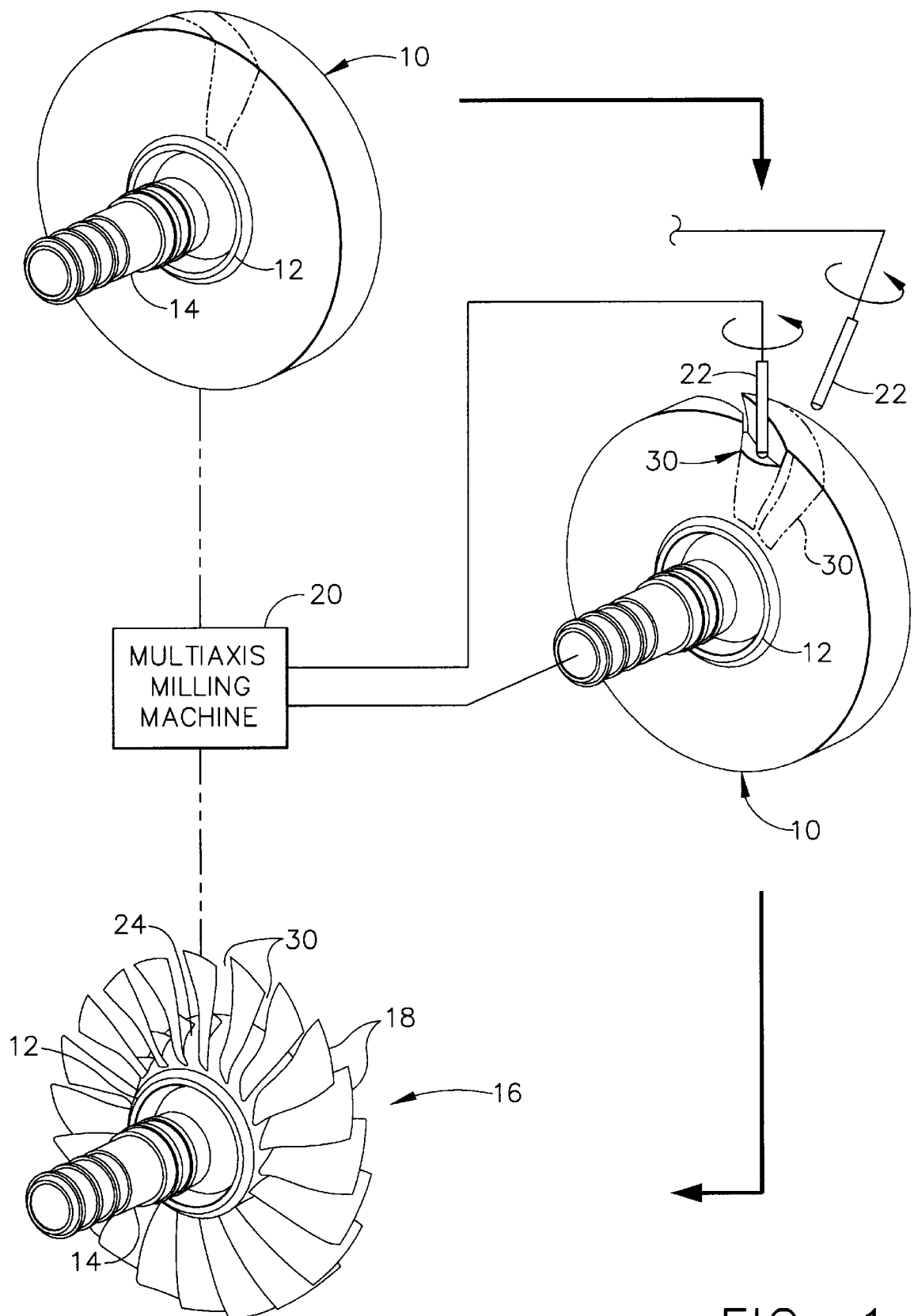
FIG. 1 is a schematic representation of a multiaxis milling machine for point milling a plurality of circumferentially spaced apart pockets in the perimeter of an initially solid blank to form a gas turbine engine rotor blisk in accordance with one embodiment of the present invention.

Illustrated schematically in FIG. 1 is a workpiece or blank 10 in the exemplary form of a solid annular disk having an annular central hub 12 or inner portion of the disk from which integrally extends a tubular shaft 14 in a unitary or one-piece assembly. The blank 10 has a conventional form specifically configured for milling a corresponding a gas turbine engine fan or compressor blisk 16 which includes a plurality of circumferentially spaced apart rotor blades 18 extending radially outwardly from the hub 12 which defines the finished rotor disk which integrally supports the several blades 18 thereon.

Each blade 18 has a conventional configuration including a generally concave pressure side and a generally convex suction side which extend from root to tip and between corresponding leading and trailing edges. Each blade has a suitable airfoil configuration which typically twists about a corresponding radial axis extending therethrough from the root to the tip of the blade, with varying taper or change in chord length therebetween. The camber of each blade also typically varies from the root to tip, with the resulting airfoil having a relatively complex 3-D contour requiring suitably smooth surface finish over the pressure and suction sides thereof for maximizing aerodynamic efficiency.

The blank 10 is milled or machined in a conventional multiaxis milling machine 20 specifically configured for rotating a cutting tool in the preferred form of a conventional ball end mill 22 for point milling the blank 10. The blank is mounted in the machine 20 relative to the mill 22 typically with five degrees or axes of movement for following complex 3-D milling paths through the blank 10 which is accomplished in multiple steps or levels radially inwardly from the perimeter of the blank 10 down to the hub 12 to define a resulting radially inner platform 24 between each of the blades 18.

The milling machine 20, the ball end mill 22, and the blank 10 are all conventional in structure and operation. As indicated in the Background section, the milling machine 20 has been previously used in commercial production of blisks for many years in multiple process steps of rough machining individual blades, semi-finishing the individual blades and platform, and finish machining the individual blades in a relatively complex, lengthy, and expensive milling process.

In accordance with the present invention, the same conventional multiaxis milling machine 20 may be used in a new and improved process of milling the same type of blank 10 with significantly improved efficiency and accuracy, and with reduced time and cost. The step milling process in accordance with an exemplary embodiment of the present invention is illustrated in increasing detail in FIGS. 2 and 3, and is represented generally by the flowchart representation shown in FIG. 4.

Figure 2:
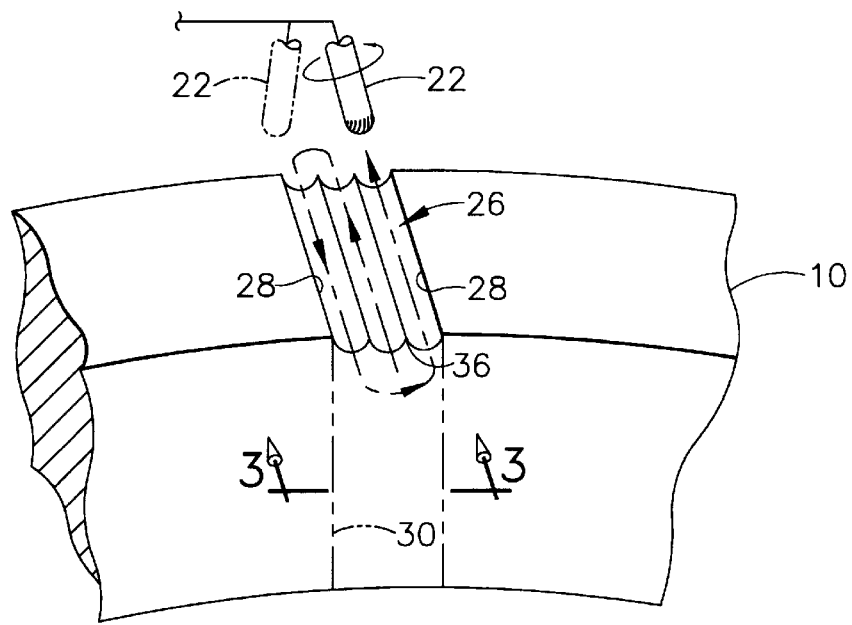
FIG. 2 is a elevational, partly sectional view through a portion of the perimeter of the blank illustrated in FIG. 1 showing a ball end mill initially forming one of the pockets therein.

Referring initially to FIG. 2, the step milling process is initiated by cutting an elongate groove 26 having an arcuate bottom to partially expose a sidewall 28 starting at the perimeter of the blank 10 by feeding the rotating mill 22 transversely across the blank. The so exposed sidewall 28 is then cut by again feeding the mill 22 transversely across the blank and along the previously cut groove 26. Then by alternately repeating the groove and sidewall cutting, the groove is step milled radially deeper in the blank and forms a corresponding pocket 30 along which the sidewall 28 extends.

Figure 3:
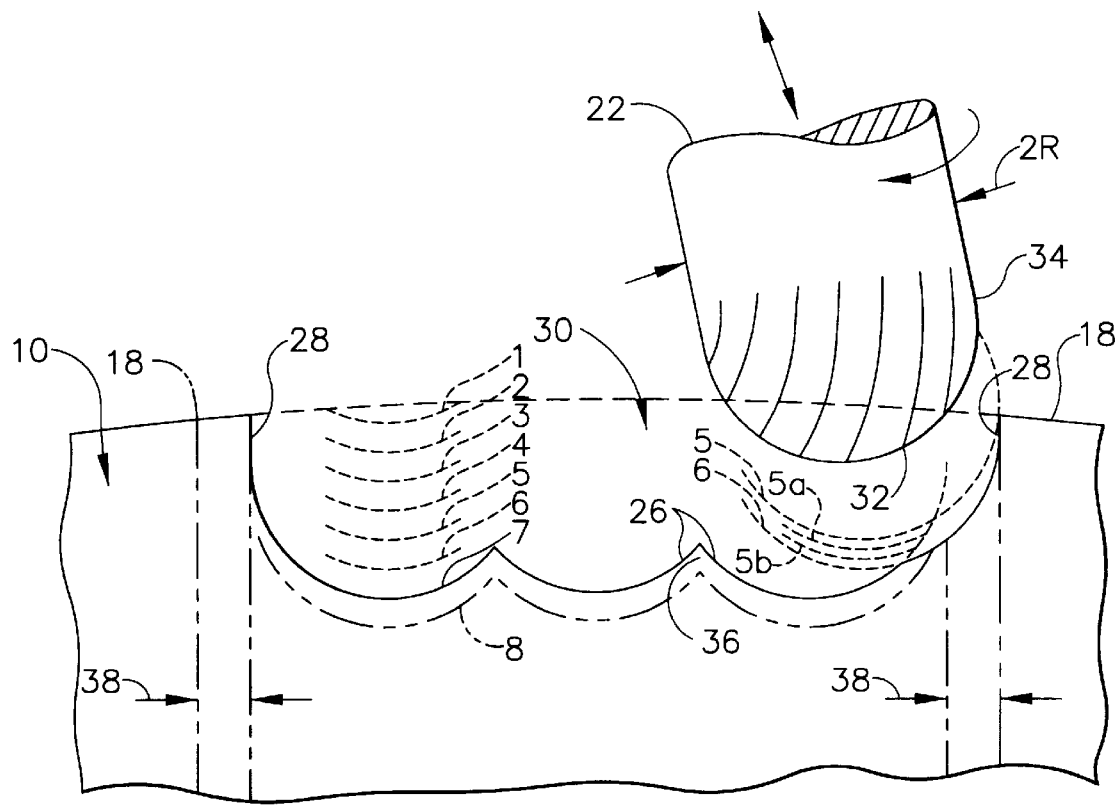
FIG. 3 is an enlarged, elevational end view of the mill illustrated in FIG. 2 cutting a plurality of grooves through the perimeter of the blank to form one of the pockets therein and taken generally along line 3—3.
Figure 4:
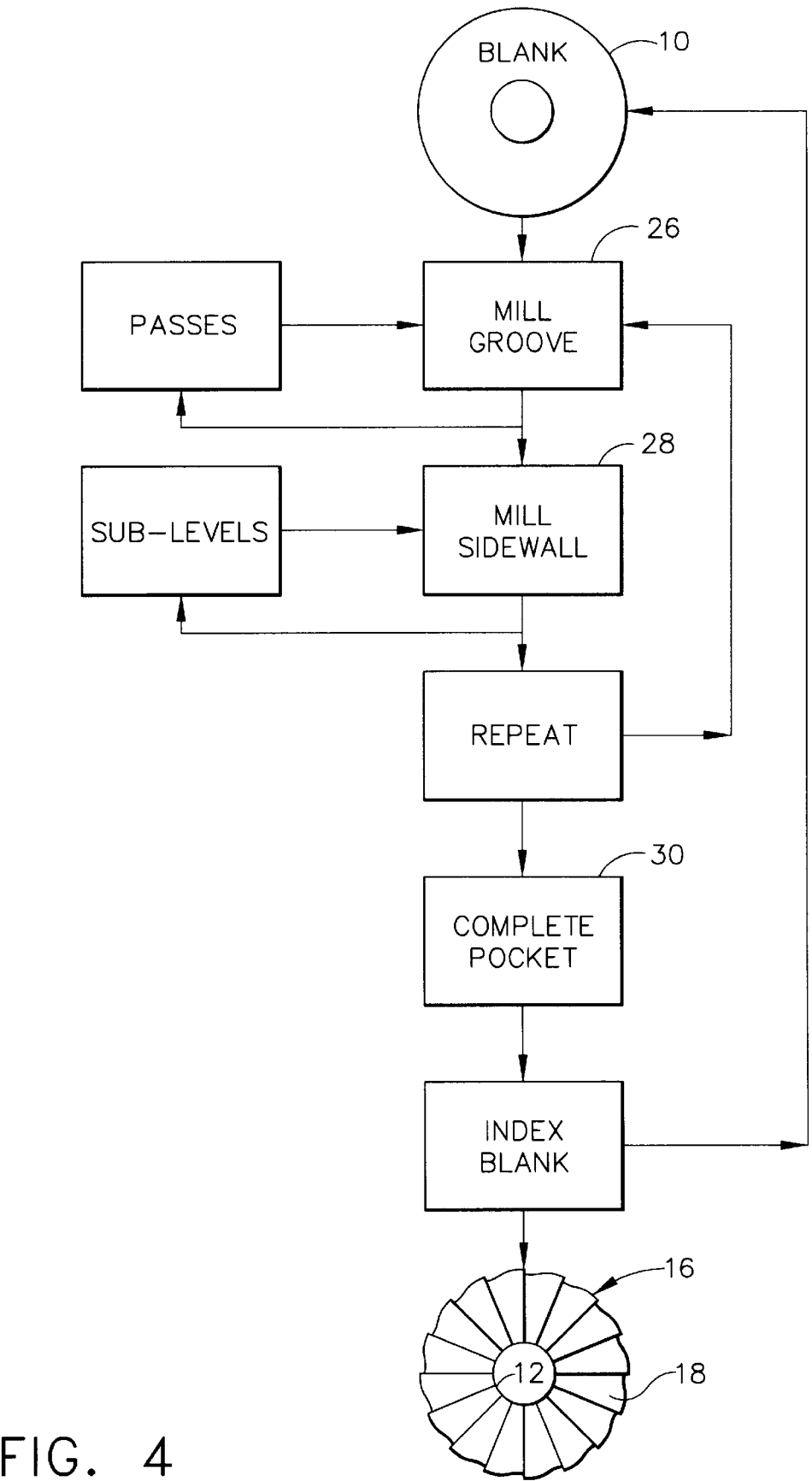
FIG. 4 is a flowchart representation of an exemplary method of step milling the blisk illustrated in FIGS. 1–3 in accordance with an exemplary embodiment of the present invention.

More specifically, the lower end of the ball end mill 22 is illustrated in more detail in FIG. 3. As indicated above, the ball end mill 22 is semispherical in configuration with an outer diameter 2R, and a radius R. A cylindrical shaft no larger than the outer diameter of the cutting end of the mill is operatively mounted in the milling machine for rotation and feeding along any desired milling path as suitably programmed into the digitally programmable controller of the machine. The entire semispherical ball end of the mill 22 has suitable cutting teeth thereon, shown schematically, and specifically includes a convex bottom portion 32 which extends diametrically to a perimeter or side 34 of the mill 22 which is also capable of cutting.

During operation, the mill 22 is rotated for cutting the groove 26 with preferably only the mill bottom 32. The pocket sidewall 28 is independently cut by using preferably only the mill side 34 at its tangency.

As initially shown in FIG. 2, the milling machine is suitably programmed for feeding the rotating mill 22 in plurality of alternating passes disposed generally in the axial direction for cutting a corresponding plurality of the grooves 26 adjoining each other at bottom cusps 36 having a common level to widen the pocket 30 between a pair of opposite or circumferentially spaced apart ones of the sidewalls 28. After the grooves 26 at one level are milled, the two sidewalls 28 are then cut in turn with corresponding sides 34 of the mill 22.

In this way, the mill bottom 32 is used for cutting the several grooves 26 to a suitably rough tolerance of plus and minus a few mils and with a suitable excess side material 38 relative to the required finish side of the respective blades 18. The pocket sidewall 28 may then be finish cut using the mill side 34 to a suitable finish tolerance significantly less than the rough tolerance and down to about 0.8 mils (0.02 mm) for example.

Although the same mill 22 may be used in a first pass to cut a single groove 26 and then fed again over that groove to use the mill side 34 to finish machine the sidewall 28, it is preferred to cut the several grooves 26 for initially widening the pocket 30 in multiple rough machining radial levels or steps followed in turn by finish machining the two sidewalls 28 using the same mill 22, and then alternately repeating the groove and sidewall cutting to deepen the pocket 30 to its final and full depth in the perimeter of the blank.

This preferred embodiment is illustrated in more detail in FIG. 3 wherein three circumferentially adjoining grooves 26 are initially formed axially across the perimeter of the blank 10 to start the formation of single one of the pockets 30. The mill 22 is fed transversely across the perimeter of the blank in three exemplary passes as illustrated in FIG. 2 to form a center groove, a left groove, and a right groove in turn.

The mill 22 may have an exemplary outer diameter 2R of about 500 mils (12.7 mm), with the mill being positioned for using only the mill bottom 32 for forming the grooves 26. In this way, the radial cutting depth of the mill is selected to cut a groove 26 in each pass substantially shorter in depth than the radius R of the mill. For example, the radial cutting depth may be about 50 mils (1.27 mm) which uses only one fifth of the available cutting radius of the mill.

The mill is then repeatedly fed across the blank in multiple transverse passes and multiple radial steps or levels, with the first seven levels 1–7 being shown in partial phantom in FIG. 3. The seven radial levels each has a radial depth of about one fifth the cutting depth of the mill 22 which is sufficient to initially form the radially outermost portion of the incipient sidewalls 28.

After milling the seventh level, the mill bottom 32 is back stepped radially outwardly from a respective one of the grooves 26 adjacent either sidewall 28 prior to cutting that sidewall. In this way, a finite gap is provided between the mill bottom 32 and the underlying previously cut groove 26. The same or common mill 22 may then be fed along the path of the underlying groove 26 near one of the sidewalls 28 for finish milling that sidewall to a suitable side-depth for achieving a suitable finished surface of the blade 18. Then the other sidewall 28 is similarly side-milled to finish dimension.

The same mill 22 is then alternately used to continue the step milling downwardly for cutting the groove 26 with the mill bottom 32 and then cutting the sidewalls 28 with the mill side 34. As shown in FIG. 3, the mill 22 is slightly inclined from the radial axis for using its side 34 for side milling one of the sidewalls 28, and is then repositioned with an opposite inclination adjacent the opposite sidewall 28 for side milling that sidewall.

In this way, the individual pockets 30 may be step milled in small depth increments corresponding with each of the initial levels 1–7 and as many additional levels, i.e. level 8 et. seq., as required to reach the final depth of the pocket at the platform. Such partial depth milling allows very high rotary speeds of the mill 22 and correspondingly high feed rates substantially greater than those possible in conventional milling where a ball end mill is typically plunged radially to its full-radius cutting depth for maximizing material removal along all available cutting surfaces of the mill.

In accordance with the invention, as each new level of material is removed, a small amount of excess side material 38 is left on each side of the corresponding blades 18 being formed. The side machining of the sidewalls 28 is preferably a finish cut made preferably just above the previous rough-ing groove level. This allows a finish cut on the side of the end mill at the ball tangency using a portion of the end mill reserved solely for finish machining, whereas the bottom of the end mill is reserved solely for rough machining.

This process of stepping down the pocket 30 while alternately roughing and finishing the bottom of the pocket 30 and the sidewalls 28 effects a more accurate airfoil shape since the blade 18 being formed is constantly supported by solid material directly below the area where the finish cut on the sidewall is being made. This stepping process proceeds until the entire pocket is finished to the platform by rough machining the pocket depth in increments and alternately finish machining the pockets sidewalls 28 in turn. The resulting pocket 30 will have the convex suction side of one blade 18 and the concave pressure side of an adjacent blade both to finished tolerance. The blank is then indexed to the next pocket and the process is repeated preferably with a new end mill 22 to avoid excess wear of the already used mill.

In the preferred embodiment illustrated in FIG. 3, each of the sidewalls 28 is side cut in a plurality of sub-steps or sub-levels spaced radially above the level of the last cut groove 26. For example, the mill 22 may be raised from level 7 to level 5 and then fed along the path of the underlying groove 26 to machine the radially outermost portion of the sidewall 28 to its finished dimension, for example. The mill 22 may then be lowered a fraction of the full rough cutting level and again fed along the corresponding groove 26 for machining an additional radially inner portion of the sidewall 28.

In the exemplary embodiment illustrated in FIG. 3, the end mill 22 is fed in four sub-levels designated 5, 5a, 5b, and 6 for side cutting the sidewall 28 to its finished dimension down to the penultimate groove at level 6 to maintain a clearance between the end mill 22 and the last cut groove 26 at level 7. Since the mill side 34 is also arcuate, small side cusps are also formed along the sidewall 28 in each side cutting pass. By using the multiple sub-level passes, the resulting side cusps are substantially removed resulting in a substantially smooth sidewall 28 for the finished blade 18.

As shown in FIG. 1, the step milling process is initially used for step milling a full-depth, complete first pocket 30 in the perimeter of the blank 10, with the blank then being circumferentially indexed to the next adjacent second pocket 30 which is then step milled in an identical manner to mill a freestanding airfoil blade 18 in the form of a cantilever extending radially outwardly from the hub 12 of the blank.

In the preferred embodiment, a first ball end mill 22 is used to step mill the entire first pocket 30 until its two sidewalls 28 are finish machined. Then, a different second ball end mill 22 of identical configuration is used to step mill the second pocket 30 completely to finish the two sidewalls 28 thereof.

Accordingly, it is preferred to use a plurality of different ball end mills of identical configuration to step mill in turn a corresponding plurality of the pockets 30 to produce a plurality of the blisk airfoil blades 18 each in the form of a freestanding cantilever having varying twist and taper from root to tip thereof to define the resulting blisk 16 illustrated in FIG. 1.

Since the mill 22 necessarily wears during cutting, it is desirable to use the same mill for both rough and finish milling in each pocket without change, if possible, to prevent the formation of a discontinuous cusp which would otherwise occur upon exchange of a new mill for a used mill mid-pocket. The single, same mill 22 uses its different portions for separately machining the successive grooves 26 and the developing sidewalls 28 to maximize cutting efficiency. The mill bottom 32 uses only a small portion of the entire mill for rough machining the corresponding grooves 26, with the mill sides 34 being used for independently sidemilling the sidewalls 28.

In both cases, only respective portions of the mill 22 are being used which therefore allows the mill to be operated at a substantially higher rotary speed than a conventional full depth cutting ball end mill, and with a substantially greater feedrate as well. Since less material is being removed in each pass of the mill compared with the full depth cutting in the conventional process, the mill develops less cutting loads and improves tool life.

Furthermore, since the finish sidemilling of the sidewalls 28 is alternately effected after rough milling a corresponding underlying groove 26, the sidewall 28 is rigidly supported with little if any circumferential flexibility as found in the freestanding conventional process. As a result, the finish milled blades 18 can be made with suitably smaller manufacturing tolerances and with a more accurate nominal dimension, and with greater accuracy from blade-to-blade. This effectively eliminates the problem of blade-to-blade manufacturing variation found in the conventional process which could cause unacceptable unbalance of the machined blisk.

Since it is desired to have relatively small blending radii between the roots of the several blades 18 and the corresponding platforms 24, a subsequent milling operation may be effected using a smaller diameter ball end mill for finish machining the individual platforms 24 in a conventional manner.

Accordingly, a single type of ball end mill 22 is used for both rough machining the grooves 26 in the pockets 30 as well as finish machining the sidewalls 28 to form the corresponding finished blades 18. A single ball end mill 22 may therefore be used to completely form an individual pocket 30 whereas the conventional process required three ball end mills to separately rough, semi-finish, and finish the pockets defining the corresponding blades.

In addition to requiring few ball end mill changes from pocket to pocket, the total number of ball end mills required for completely machining the entire blisk is about half the total number of ball end mills used in the conventional process. And a substantial reduction in the number of individual cuts or passes is also achieved in accordance with the invention.

Furthermore, the collective advantages of using a single end mill for both roughing and finishing each pocket 30 result in a substantial reduction in overall time for producing the complete blisk 16, roughly a 50% reduction in total time.

As a result, the finished blisk 16 step milled in accordance with the present invention includes a plurality of blades 16 extending radially outwardly from the common hub 12 with improved accuracy and finish as compared with a conventionally point milled blisk. The 3-D contour of the individual blades is more precise from blade-to-blade and has a distinctly different and substantially smoother surface contour achieved with a substantial reduction in number of cutting passes. The improved blisk 16 itself therefore has aerodynamic and structural advantages over the conventionally point milled blisk.

The step milling process significantly decreases processing time since there are fewer cuts required to rough and finish the blisk, and those cuts can be done at a significantly faster feedrate and rotary speed because of the shallow depth of each cut. This, in turn, reduces cutting forces for reducing wear and tear on the ball end mills as well as on the milling machine 20 itself. The step milling process is now focused on milling an accurately sized pocket 30 instead of milling around individual blades, resulting in a more accurate air flowpath through the pocket and between the adjacent blades.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention. For example, the step milling process may be used on any other type of component, besides blisks, which require rough and finish machining in steps. And, other shapes of end mills may also be used.

Accordingly, what is desired to be secured by Letters Patent of the United States is the invention as defined and differentiated in the following claims in which

I claim:

1. A method of milling a blank with a rotating mill comprising:

cutting a groove having a bottom to partially expose a sidewall in said blank by feeding said rotating mill across said blank;

cutting said sidewall by feeding said mill along said groove; and alternately repeating said groove and sidewall cutting to step mill said groove deeper in said blank and form a pocket along which said sidewall extends.

2. A method according to claim 1 further comprising:

cutting said groove with a bottom of said rotating mill; and cutting said sidewall with a side of said rotating mill.

3. A method according to claim 2 further comprising:

back stepping said mill bottom away from said groove prior to cutting said sidewall; and using a common mill for alternately cutting said groove with said mill bottom and said sidewall with said mill side.

4. A method according to claim 3 further comprising:

cutting a plurality of said grooves adjoining each other at a common level to widen said pocket between a pair of said sidewalls; and cutting both of said sidewalls in turn with said mill side.

5. A method according to claim 3 further comprising cutting said sidewall in a plurality of sub-steps spaced above said groove.

6. A method according to claim 3 further comprising:

step milling a first pocket in said blank; and step milling a second pocket in said blank spaced from said first pocket to mill a cantilever extending outwardly from said blank.

7. A method according to claim 6 further comprising:

using a first mill to step mill said first pocket; and using a different second mill to step mill said second pocket.

8. A method according to claim 7 further comprising using a plurality of different mills to step mill in turn a plurality of said pockets to produce a plurality of said cantilevers in the form of airfoil blades having varying twist and taper from root to tip thereof.

9. A method according to claim 7 wherein:

said groove cutting has a rough tolerance; and said sidewall cutting has a finish tolerance less than said rough tolerance.

10. A blisk (16) step milled by the process of claim 7 to produce a plurality of blades extending radially outwardly from a common hub.

* * * * *